United States Patent Office 2,854,422
Patented Sept. 30, 1958

2,854,422
COMPOSITION COMPRISING DIISOCYANATE-LINKED ELASTOMERS AND LIGNIN

Robinson F. Nichols, Cuyahoga Falls, Ohio, assignor to The B. F. Goodrich Company, New York, N. Y., a corporation of New York No Drawing. Application February 1, 1955
Serial No. 485,590

5 Claims. (Cl. 260—17.5)

This invention relates to a novel composition of matter comprising diisocyanate-linked elastomers and lignin and relates more particularly to mixtures of glycol-based diisocyanate-linked condensation elastomers and lignin and to the method of making the novel composition of matter.

Diisocyanate-linked elastomers obtained by reaction of polyesters, polyesteramides, polyalkylene ether glycols and the like with organic diisocyanates are known. It is also known that the fillers ordinarily used in compounding the more conventional elastomers do not improve the physical properties of diisocyanate-linked elastomer vulcanizates and in most cases result in compositions having poor physical properties.

Since it is desirable to use fillers in compounding elastomers, it is an object of this invention to provide a composition of matter comprising a diisocyanate-linked elastomer and a filler which improves certain physical properties of the filled elastomer vulcanizate without seriously degrading other desirable characteristics of the vulcanizate. It is a further object to provide a composition of a diisocyanate-linked elastomer and a filler which has good hot stress-strain properties when vulcanized. It is another object of this invention to provide a composition of matter which is useful in many elastomer applications and which is cheaper than the presently known diisocyanate-linked elastomers while retaining desirable physical properties of the elastomer particularly in a vulcanized state.

It has now been found that the objects of this invention are accomplished through the addition of lignin to diisocyanate-linked elastomers. Diisocyanate-linked elastomer vulcanizates containing lignin as a compounding ingredient have extremely good hot tensile strength. They also have higher moduli, are harder, and have greater tear resistance than diisocyanate-linked elastomers which do not contain lignin. Further, such compositions have good resilience and are quite snappy, and the cure rate of the compounded diisocyanate-linked elastomer is not interfered with. This is to be contrasted to GR–S compounds which, when they are milled with dry lignin, have poor resilience, are loggy and have poor cure rates. Further, when lignin is milled into GR–S, poor dispersion of pigment into polymer is obtained and very little reinforcement of the polymer is obtained. Quite unexpectedly and contra to experience with GR–S, lignin may be readily milled into diisocyanate-linked elastomers to obtain useful compounds.

Finely-divided lignin is added to the diisocyanate-linked elastomer on a mill, in a mixer or by means of the usual methods employed in compounding such elastomers. The resulting mixtures may be vulcanized by heating the compound containing additional diisocyanate or other vulcanizing agents for diisocyanate-linked elastomers. The additional diisocyanate may be any aliphatic, alicyclic or aromatic diisocyanate known to those skilled in the art.

The amount of lignin ordinarily employed may be varied from about 1 to about 50 weight parts per 100 weight parts of diisocyanate-linked elastomer depending upon the degree of extension and end-product physical properties desired. Preferably an amount of lignin from about 5 to about 30 weight parts is ordinarily employed to obtain compounded vulcanizates of optimum physical properties.

The exact composition of lignin, of course, is not known. However, any of the known lignins may be employed in the practice of this invention. Preferred is purified pine wood lignin derived from a paper pulp sulfate black liquor (alkali lignin). A useful grade of this type is supplied by West Virginia Pulp and Paper Company as Indulin A which is a brown, free flowing powder of small particle size, pigment grade, which has a specific gravity of about 1.3 and which is greater than 99% organic material. The lignins have fusion points from about 250° F. to greater than 600° F. Most preferred in the practice of this invention is a purified pine wood lignin fraction which may or may not be oxidized and which has a fusion point of about 300° F. to or greater than 600° F. Particularly valuable are oxidized lignins which have fusion points above about 600° F. and which have low acetone solubility, preferably less than 35%, and which may be prepared, for example, by dissolving the lignin known as Indulin A in alkali and blowing air or oxygen through the solution and subsequently separating the oxidized lignin therefrom.

The diisocyanate-linked condensation elastomers and methods for their preparation are well known. U. S. Patents 2,432,148, 2,621,166, 2,625,531, 2,625,532 and 2,692,874 describe various methods of preparation. The diisocyanate-linked elastomers are known by a variety of names including Vulcaprene, Vulcollan, Estane G, Chemigum SL and Adiprene. Ordinarily a polyester, polyesteramide or polyalkylene ether glycol of a molecular weight from about 800 to 5000 is reacted with an aromatic diisocyanate in a molar ratio such that ordinarily there is an excess of diisocyanate added. The resulting diisocyanate-linked elastomer is essentially a linear polyurethane which is cured or vulcanized by mixing with additional organic diisocyanate and heating, unless there is sufficient excess diisocyanate initially mixed with the polyester or polyesteramide, in which case further heating and/or exposure to bifunctional additives such as water, diamines, glycols and the like causes curing or vulcanization. The excess organic diisocyanate may be present or added in amounts from about 1 to 25, preferably about 3 to 15, weight parts per 100 weight parts of diisocyanate-linked elastomer.

The polyesters are ordinarily formed by the condensation reaction of a dibasic (dicarboxylic) aliphatic acid with a glycol, ordinarily a $C_2$ to $C_{10}$ glycol and a $C_4$ to $C_{10}$ dibasic acid. The polyesteramides are formed by the condensation of a dibasic (dicarboxylic) aliphatic acid with a mixture of a glycol, an amino alcohol and/or a diamine. In the case of the amino alcohol or diamine the latter two ingredients ordinarily are present in the reaction mixture in an amount less than one-half the amount of glycol employed so that the major portion of the linkages in the polymer chain are ester linkages with a minor proportion of amide linkages being present.

The reaction product of the polyester, polyesteramide or polyalkylene ether glycol and an organic diisocyanate is ordinarily a rubbery material. There are many modifications of the chain-extending reaction of the basic polyester, polyesteramide or polyalkylene ether glycol with the organic diisocyanate such as the reaction being conducted in the presence of small amounts of glycols, diamines, water and the like, but basically, most of the diisocyanate-linked elastomers are glycol-based condensation polymers.

Regardless of how the diisocyanate-linked elastomer is prepared, the addition of lignin thereto results in novel compositions and vulcanizates, which, among other valuable properties, have extremely good hot tensile properties when compared to the hot tensile properties of similar compositions containing other fillers used in standard rubber compounding recipes.

In a typical embodiment of the invention, a diisocyanate-linked elastomer is prepared by first reacting an excess of ethylene glycol with adipic acid. One mol of the resulting hydroxyl poly(ethylene adipate)ester, which has a molecular weight of about 1400, is mixed with 0.3 mol of water and this mixture is reacted with 1.2 mols of para-phenylene diisocyanate at about 110° C. for about 30 minutes. The viscous reaction product is poured into a container and heated further for about 2 hours. The resulting diisocyanate-linked polyurethane is a snappy, transparent, elastomer gum which will process on a two roll mill at about 160° F. Twenty volumes of lignin known as Indulin A are added to 100 volumes of the polyurethane in the recipe given below. For comparison purposes 20 volumes of standard rubber fillers are added to other portions of the same polyurethane gum. The compounded vulcanizates are heated for 30 minutes at 298° F. and the stress-strain properties determined at room temperature and at 212° F. The compounding recipe is:

Materials: Parts
 Polyurethane gum_____ 100.00.
 Beeswax_____ 0.2.
 1,5-naphthylene diisocyanate____ 5.62.
 Pigment_____ Table below
 (20 volumes).

The resulting vulcanizates of the specified filler have the following listed physical properties:

| Pigment | Indulin A | Red Iron Oxide | Calcium Silicate | Clay | Zinc Oxide | Magnesia |
|---|---|---|---|---|---|---|
| Parts | 20.9 | 81 | 33.6 | 41.6 | 90.3 | 53 |
| Tensile Strength, p. s. i. (room temperature) | 4,900 | 2,800 | 3,000 | 3,200 | 1,500 | 1,800 |
| 300% Modulus, p. s. i. (room temperature) | 1,100 | 700 | 550 | 1,350 | 100 | 500 |
| Elongation, percent (room temperature) | 750 | 925 | 900 | 625 | 885 | 825 |
| Tensile Strength, p. s. i. (at 212° F.) | 1,300 | 150 | 0 | 100 | 0 | 0 |
| Elongation, percent (at 212° F.) | 800 | 500 | 500 | 165 | 165 | 150 |

As is obvious from the above data, lignin is an extremely valuable additive for use in extending diisocyanate-linked elastomers. The hot tensile properties of a lignin containing diisocyanate-linked elastomers are outstanding. Quite striking also is the physical appearance of a lignin containing diisocyanate-linked elastomer which is light in color, has a smooth appearance, has excellent tear resistance and is quite snappy in contrast to the crumbly, cheesy characteristics of diisocyanate-linked elastomers containing the other fillers listed above.

Even better are the physical properties of diisocyanate-linked elastomers containing oxidized lignins. The starting material in this case is a lignin fraction derived from the pine wood paper sulfate process which is dissolved in alkali and oxidized by blowing air or oxygen through the solution. A polyurethane prepared as described above is compounded in a similar recipe with 10.8 parts of an oxidized lignin, and the resulting vulcanizates have tensile strengths at room temperature of 6800 pounds per square inch, a 300% modulus of 100, and an elongation of 675%. At 212° F. the tensile of this composition is 3480 pounds per square inch and the elongation 875%. Further, this lignin containing polyurethane has extremely good tear resistance, and Yerzley resilience values of 95.6 as compared to values of 55 for clay compositions and 65 for calcium silicate compositions with the same diisocyanate-linked elastomer.

Similar results are obtained when other diisocyanate-linked elastomers, including those derived from polyester-amides and polyethylene glycols, are employed. Good stress-strain properties are obtained in each case. Good dynamic properties and improved tear resistance are obtained in contrast to other fillers which deteriorate the desirable properties of diisocyanate-linked elastomers and which have exceedingly poor hot stress-strain properties. It is understood, of course, that filled diisocyanate-linked elastomers which are not vulcanized are also useful in many applications where an unvulcanized material is desired.

I claim:

1. A composition of matter comprising 100 weight parts of a diisocyanate-linked condensation elastomer comprising essentially the reaction product of an organic diisocyanate with a material having a molecular weight of from about 800 to 5,000 and being selected from the group consisting of a polyester having essentially a plurality of ester linkages in the main polymer chain and being obtained by the condensation reaction of a dicarboxylic aliphatic acid with a glycol, a polyesteramide having essentially a plurality of a predominating amount of ester linkages and a minor amount of amide linkages in the main polymer chain and being obtained by the condensation reaction of a mixture of a dicarboxylic aliphatic acid, a glycol and at least one organic amine compound selected from the group consisting of an amino alcohol and a diamine, said amine compound being present in said mixture in an amount less than one-half the amount of said glycol, and a polyalkylene ether glycol having essentially a plurality of ether linkages in the main polymer chain and, as the essential filler, about 1 to about 50 weight parts of a finely divided lignin having a fusion point of greater than about 250° F.

2. The composition of matter of claim 1 wherein the lignin is a purified pine wood lignin having a specific gravity of about 1.3 and a fusion point of about 300° F. to about 600° F.

3. The composition of claim 1 wherein the lignin is a finely divided oxidized pine wood lignin having a fusion point above about 600° F. and acetone solubility less than 35%.

4. The composition of matter of claim 3 wherein the lignin is present in amount from about 5 to about 30 weight parts.

5. A mill mixed composition of matter comprising 100 weight parts of a diisocyanate-linked condensation elastomer comprising essentially the reaction product of an organic diisocyanate with a material having a molecular weight of from about 800 to 5,000 and being selected from the group consisting of a polyester having essentially a plurality of ester linkages in the main polymer chain and being obtained by the condensation reaction of a dicarboxylic aliphatic acid and a glycol, a polyesteramide having essentially a plurality of a predominating amount of ester linkages and a minor amount of amide linkages in the main polymer chain and being obtained by the condensation reaction of a mixture of a dicarboxylic aliphatic acid, a glycol and at least one organic amine compound selected from the group consisting of an amino alcohol and a diamine, said amine compound being present in said mixture in an amount less than one-half the amount of said glycol, and a polyalkylene ether glycol having essentially a plurality of ether linkages in the main polymer chain, from about 3 to 15 weight parts of an organic diisocyanate and, as the essential filler, from about 1 to about 50 weight parts of a finely divided lignin having a fusion point of greater than about 300° F.

References Cited in the file of this patent

UNITED STATES PATENTS

| | | |
|---|---|---|
| 2,424,884 | Cook et al. | July 29, 1947 |
| 2,608,537 | Pollak | Aug. 26, 1952 |
| 2,650,212 | Windemuth | Aug. 25, 1953 |
| 2,751,363 | Martin | June 19, 1956 |

UNITED STATES PATENT OFFICE
CERTIFICATE OF CORRECTION

Patent No. 2,854,422 September 30, 1958

Robinson F. Nichols

It is hereby certified that error appears in the printed specification of the above numbered patent requiring correction and that the said Letters Patent should read as corrected below.

Column 3, line 66, for "modulus of 100" read -- modulus of 1000 --.

Signed and sealed this 2nd day of June 1959.

(SEAL)
Attest:

KARL H. AXLINE
Attesting Officer

ROBERT C. WATSON
Commissioner of Patents